United States Patent [19]

Nunlist et al.

[11] 4,264,215

[45] Apr. 28, 1981

[54] SEPARABLE BLADE IMPELLER

[75] Inventors: Erwin J. Nunlist, Penfield; Vincent J. Piarulli; Franklyn J. Amorse, both of Greece, all of N.Y.

[73] Assignee: Sybron Corporation, Rochester, N.Y.

[21] Appl. No.: 76,195

[22] Filed: Sep. 17, 1979

[51] Int. Cl.³ .............................................. B01F 7/16
[52] U.S. Cl. ..................................... 366/279; 366/343
[58] Field of Search ............... 366/129, 279, 285, 286, 366/308, 325, 326, 330, 331, 343, 605; 416/175 R, 203

[56] References Cited

U.S. PATENT DOCUMENTS

| | | | |
|---|---|---|---|
| 661,092 | 11/1900 | Turner et al. | 366/286 |
| 2,151,146 | 3/1939 | Petry | 366/331 |
| 3,455,540 | 7/1969 | Marcmann | 366/325 X |
| 4,193,702 | 3/1980 | Davis | 366/343 |

Primary Examiner—Philip R. Coe
Attorney, Agent, or Firm—Theodore B. Roessel; Roger Aceto

[57] ABSTRACT

A symmetrical, balanced, glass coated, four bladed impeller for use in closed vessels having blades arranged so that the impeller may fit through a relatively small manhole even though the effective diameter of the impeller is substantially larger than the manhole.

5 Claims, 4 Drawing Figures

SEPARABLE BLADE IMPELLER

BACKGROUND OF THE INVENTION

The present invention relates to glass coated, separable impellers for use in closed, glass lined vessels to mix and agitate corrosive, adhesive, abrasive or easily contaminated ingredients such as acids, polymers, pharmaceuticals, dyes, food stuffs and the like.

Closed, glass lined vessels as used by the chemical, pharmaceutical or food industry may range in size to several thousand gallons and in the case of reactors, may be able to withstand relatively high internal pressures. In such vessels, it is desirable to have as small an access opening as possible to increase the integrity of the vessel and reduce the overall cost of vessel construction.

Since impellers used in these vessels may have an effective diameter or span equal to 40% to 60% of the vessel diameter the problem is how to provide such a vessel with an impeller of this size while limiting access openings to the size of manholes.

In the prior art this is accomplished by one of several means. For example, the impeller could have a split hub wherein the separate hub pieces, each with an impeller blade or two, could pass easily through a manhole size opening. The split hub would then be assembled to the end of the agitator drive shaft within the vessel by bolting or clamping the split hub pieces to the shaft. This is not entirely satisfactory because the fasteners used may loosen and those made of reactive metals to resist corrosion are frequently weak and always expensive. Also, protruding bolts or clamps provide places where product can accumulate as when mixing polymers.

Another way is to provide several hubs each with one or two impeller blades. These pass easily through a manhole opening and are stacked on the impeller drive shaft to provide a balanced three or four bladed impeller. This latter method is generally described in U.S. Pat. Nos. 2,811,339 and 3,494,708. While such construction has the advantage of the exposed surfaces being glass coated, the surface finishes and mechanical means needed to provide a gasketless, leak-proof connection are difficult to manufacture economically.

The present invention avoids the problems of split hubs or of the need to stack hubs by providing an impeller of unitary construction having four blades extending from a single hub in a unique, balanced arrangement which permits the impeller to pass through a manhole size opening even though the span of the unitary impeller is substantially greater than any manhole diameter.

SUMMARY OF THE INVENTION

The present invention may be characterized in one aspect thereof by the provision of a glass coated impeller for a separable blade agitator, the impeller being of one piece construction including a hub and four impeller blades extending from the hub, the effective diameter of the impeller being substantially larger than a manhole size opening in the vessel. The four impeller blades are grouped in two pairs fixed to and extending from generally opposite sides of the hub to provide a balanced structure, wherein the included angle between the impeller blades of a pair is about 60° and the included angle between adjacent impeller blades of each pair is about 120°.

DESCRIPTION OF THE PREFERRED EMBODIMENTS

Figure 1:
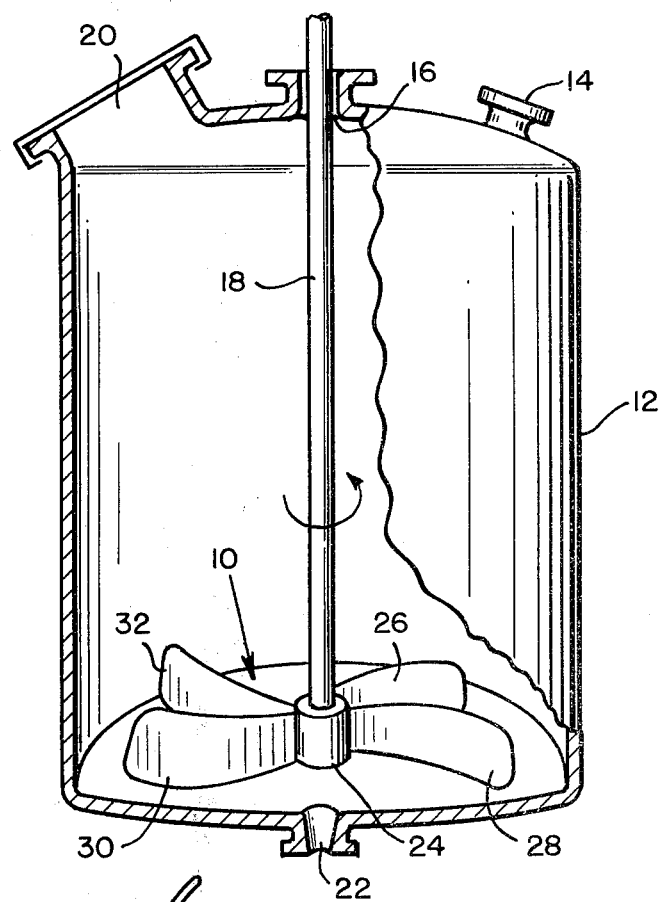
FIG. 1 is a view of a closed pressure vessel partly broken away and in section showing an agitator having the four-bladed, one piece impeller of the present invention.

Referring to the drawings, FIG. 1 shows the separable, one piece four-bladed impeller generally indicated at 10 attached to the end of a drive shaft 18 within a closed pressure vessel 12. The vessel itself may be briefly described as a standard reactor used in the chemical industry for carrying out various reactions involving corrosive, adhesive, pharmaceutical or abrasive material. Such a vessel may also be used to process various food stuffs. These vessels ordinarily would be able to withstand relatively high internal pressures, have a capacity of several thousand gallons and would have their internal surfaces provided with an easily cleaned corrosion and abrasion resistant coating such as glass or the like. To simplify the description, the coating will be described herein as being "glass" but it should be understood that this term is to include any of the vitreous, partly devitrified ceramic or enamel coatings well known in the art as being applied to vessels, agitators and baffles of the type described herein.

These vessels would have one or more top located openings including an opening 14 for a baffle or temperature probe, an opening 16 to accommodate the passage of the agitator drive shaft 18 and a manhole opening 20. Typically the manhole opening may range in size from a 12×14 inch elipse to a 24 inch round opening. A drain or other clean out opening 22 could be provided adjacent at the bottom of the vessel. It should be appreciated that all of these openings can be sealed to retain the internal pressure, the seal between opening 16 and shaft 18 being a rotary seal (not shown) to permit some drive means outside of the vessel to rotate agitator shaft 18 and impeller 10 for purposes of mixing the contents of the vessel.

As the effective diameter of an impeller 10 is preferably 40 to 60% of the vessel diameter, the problem is how to carry an impeller which may have a span of 30 to 50 inches into the vessel through manhole opening 20 which may be no larger than 24 inches in diameter. As set out above, this is accomplished in the prior art by having one or two blades on each part of a split hub or on separate hubs which are then stacked one above the other on the shaft.

Figure 2:
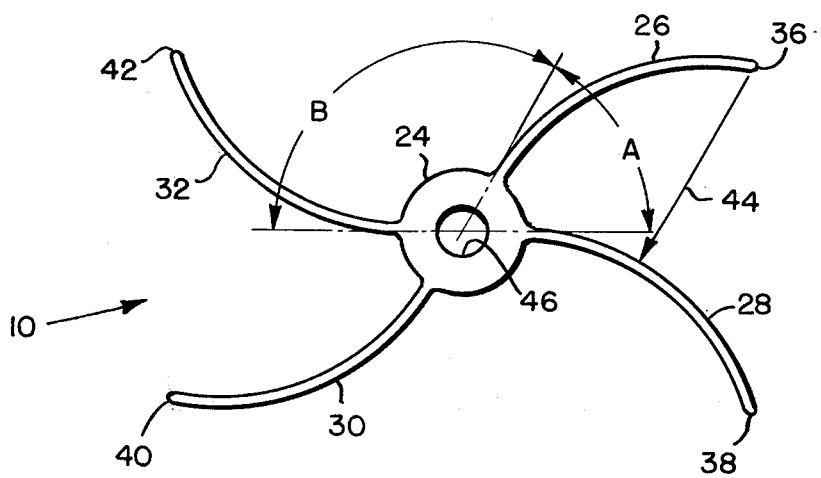
FIG. 2 is a plan view of the impeller of the present invention.

As shown in FIGS. 1 and 2, however, impeller 10 of the present invention has a single hub 24. Joined to this hub so as to provide a unitary construction, are four impeller blades 26, 28, 30 and 32. Preferably, each blade is a retreat curve. In addition the blades are grouped in two pairs each extending generally from opposite sides of the hub. Thus, when considering the direction of rotation as being counterclockwise as viewed in FIG. 2, the leading and trailing blades 26, 28 respectively of one pair are on one side of the hub while the leading and trailing blades 30, 32 respectively of the other pair are on the opposite side of the hub.

The blades 26, 28, 30, 32 are arranged about the hub to provide a balanced structure. In this respect, the included angle B between the leading blade (26 or 30) of one pair and the trailing blade (28 or 32) of the other pair is between 105° and 130° and preferably about 120°. Concurrently, the included angle A between the leading and trailing blades of each pair is between 50° and 75° and preferably, about 60°.

With impeller blades 26, 28, 30 and 32 disposed about hub 24 in this fashion, the impeller can be said to be generally rectangular in plan view. The outward ends 36, 38, 40 and 42 of each of the impeller blades 26, 28, 30 and 32 respectively lie at the corners of the rectangle and the effective diameter or span of the impeller is the length of the diagonal of the rectangle. This effective diameter may be much larger than the largest manhole opening and still the impeller may be carried into the vessel in one piece through such an opening and attached to drive shaft 18.

The preferred embodiment is to have the impeller blades arranged such that the included angle between the impeller blades of a pair (angle A) is about 60° and the included angle between adjacent blades of each pair (angle B) is approximately 120°.

Also, it is preferred that each impeller blade follow a retreat curve which is a circular arc section as shown in FIG. 2. With this arrangement the largest vessel manhole opening needed to accommodate passage of the impeller is about equal to the distance indicated at 44 which represents the length of the perpendicular line extending from the end of the leading blade of either pair to the trailing blade.

As a practical matter where the blades are curved, the actual diameter of the manhole opening must be slightly larger than theoretical in order to allow for the vessel wall thickness and the depth of any collar about manhole opening 20. This is because the curved impeller is rotated as it is fed through the vessel opening as set out below.

Figure 4:
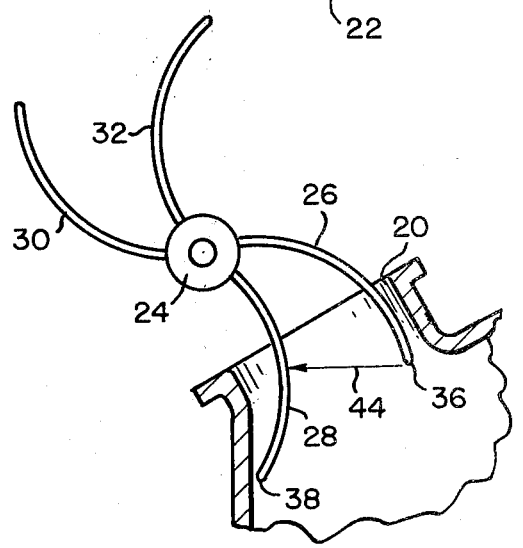
FIG. 4 shows how the impeller being passed through a manhole size opening.

To pass the impeller having the preferred curved blades through manhole 20, the impeller is oriented as shown in FIG. 4 and snaked through the opening. First, the end 38 of trailing blade 28 is inserted into the manhole at one side of the opening and the impeller tipped clockwise as end 38 and a portion of trailing blade 28 passes through the opening. End 36 of the leading blade 26 then passes through at the opposite side of the manhole. The impeller continues to tip clockwise until hub 24 is passed. Thereafter, it is tipped counterclockwise to pass first the leading blade 30 and then the trailing blade 32 through the opening.

In the preferred embodiment, each blade as shown in FIG. 2 has a constant radius of curvature from its point of attachment to the hub to its outer end. Tests have shown that an impeller of this design wherein angles A and B are 60° and 120° respectively consumes more power and therefore is generally more effective than a typical three bladed impeller of the same span and retreat curve design wherein the three blades are disposed at 120° intervals. This preferred four bladed design, however, does not consume as much power as a more conventional four bladed impeller of the same effective diameter and with the blades set at 90°. However, and more importantly, if each of the conventional three or four bladed impellers described above is made of one piece construction, it could not be passed into a closed vessel through a manhole size opening substantially smaller than the effective diameter of the impeller. The impeller of the present invention not only has the advantage of being made in a one piece construction, it also is able to fit through a manhole opening which is considerably smaller than the effective diameter of the impeller as shown in Table I below.

TABLE I

| Vessel Diameter | Capacity | | Manhole Size Needed | Impeller Diameter |
|---|---|---|---|---|
| 48" | 500 | Gals. | 12" × 16" oval | 32" |
| 60" | 1000 | " | 14" × 18" oval | 33" |
| 78" | 2000 | " | 14" × 18" oval | 34" |
| 96" | 4000 | " | 18" round | 42" |
| 132" | 10,000 | " | 24" round | 56" |

In contrast Table II below shows the relatively larger opening sizes need to accommodate a unitary three bladed impeller as conventionally used.

TABLE II

| Vessel Diameter | Impeller Diameter | Opening |
|---|---|---|
| 48" | 36" dia. | 24" round |
| 60" | 44" | 30" round |
| 78" | 44" | 30" round |
| 96" | 54" | 36" round |
| 132" | 72" | 54" round |

Comparing Tables I and II it is seen that the four bladed impeller of the present invention is able to fit through considerably smaller diameter openings or ovals than a standard three bladed impeller of like diameter or span. For example, a four bladed impeller of the present invention having a 56" span will fit through the same 24" size opening as a conventional three bladed impeller having only a 36" span.

It is preferred that angle A range from 50° to 75° and that angle B range from 105° to 130°. Increasing angle A (or decreasing angle B) to about 90° greatly increases the diameter of the vessel opening needed to pass the impeller. Conversely, decreasing angle A (or increasing angle B) brings the blades of each pair closer together so that the impeller approaches the shape of a simple paddle having two blades disposed 180° apart. Such a paddle is significantly less efficient and dynamically less stable than either the three or four bladed design.

Figure 3:
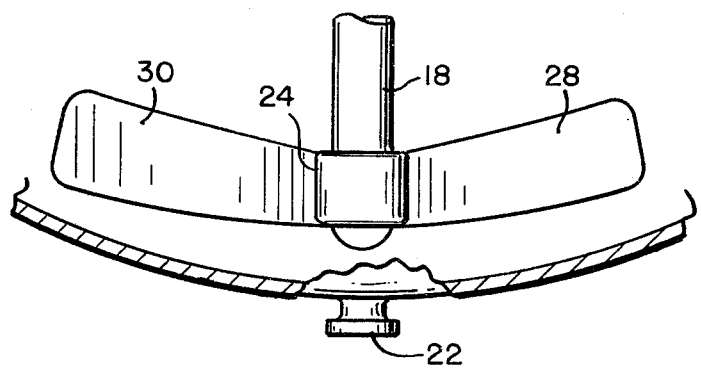
FIG. 3 is a elevation view of the impeller.

In order to mount impeller 10 to the end of drive shaft 18 within the closed vessel, hub 24 is provided with an axial bore 46 adapted to receive the lower end of the shaft 18 (FIGS. 1 and 3). While any suitable means well known in the art may be used to affix impeller 10 to the lower end of the drive shaft 18, it is preferred that the connection be made by an interference fit. Such an interference fit may be effected by cooling the lower end of shaft 18 to shrink its diameter by an amount sufficient to permit insertion of the shaft through bore 46. Thereafter, when the shaft warms to ambient temperature and expands, it will provide an interference fit between the shaft and the impeller hub. In order to accomplish this interference fit it should be appreciated that the outside diameter of at least the lower portion of shaft 18 and the inside diameter of bore 46 should be machined to close tolerances. It has been found that an interference fit of approximately 0.00025 to 0.00075 inches per inch diameter is sufficient to provide a strong interference fitted joint.

Another advantage of the one piece construction is that the entire outer surface of the impeller including the hub, the impeller blades and the internal surface of bore 46 can be provided with a continuous unbroken glass coating which adds to the integrity of the one piece construction of the four bladed impeller of the present invention.

If the bottom of vessel 12 is dished, FIG. 3, shows that the blades may be tilted upwardly from hub 24 so that the full length of the impeller can lie close to the vessel bottom. The preferred angle of this tilt is about 15°. This allows agitation and mixing of material which lies on or near the bottom of the vessel.

While the preferred design is shown having each of the four blades curved in a continuous circular arc section, it should be appreciated that other curvatures could be used. Also, blades 26, 28, 30 and 32 could be straight. However, straight blades increase the size of the manhole opening needed over the same diameter impeller having curved blades because in the straight blade design, distance 44 is greater.

Thus, it should be appreciated that the present invention provides a unique, four balded, glass coated impeller of one piece construction which is able to fit through a manhole vessel having a substantially smaller diameter than the span of the impeller.

We claim:

1. In a impeller for attachment to an agitator drive shaft within a closed vessel having at least one manhole opening, the improvement comprising:
   (a) said impeller being of one piece construction including a hub having a central bore therethrough for attachment to said shaft, and four impeller blades formed integral with and extending outwardly from said hub;
   (b) said blades being grouped in pairs at generally opposite sides of said hub, one blade of each pair being a leading blade in the direction of rotation and the other being a trailing blade, the angle of arc between said leading and trailing blade of each pair being about 50°–70° and the angle of arc between the leading blade of one pair and the trailing blade of the other pair being about 105° to 130°;
   (c) the span of said impeller being greater than the diameter of said manhole; and
   (d) the perpendicular distance from the end of the trailing blade of each pair to the leading blade of each pair being shorter than the manhole diameter.

2. An impeller as in claim 1 wherein each impeller blade is curved.

3. An impeller as in claims 1 or 2 wherein each impeller is curved from said hub to its outward end, the curve having a constant radius.

4. An impeller as in claims 1 or 2 wherein the included angle between the blades of each pair is about 60°.

5. An impeller as in claims 1 or 2 including a smooth, continuous and unbroken glass coating extending over the entire outer surface of said impeller blades and hub.

* * * * *